Sept. 26, 1967 R. A. HOLZL 3,343,589
GASEOUS DEPOSITION METHOD OF MAKING A THERMOCOUPLE PROBE
Filed June 25, 1964
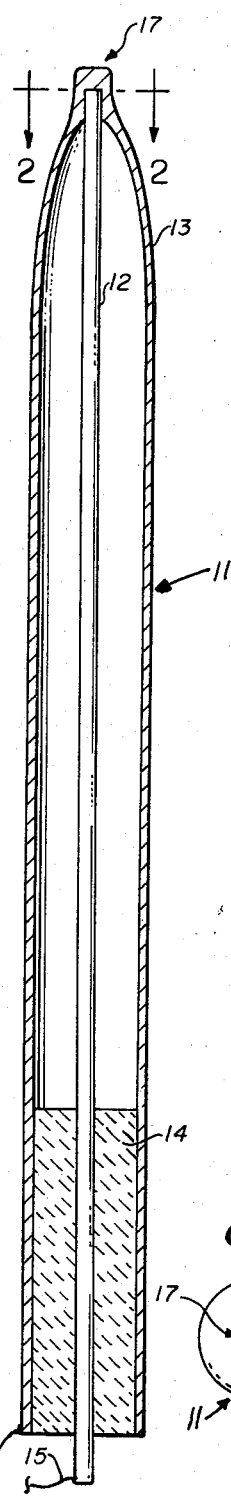
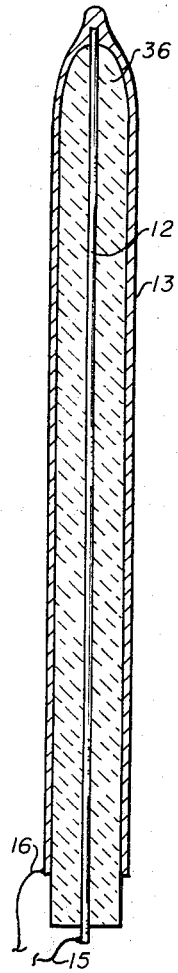
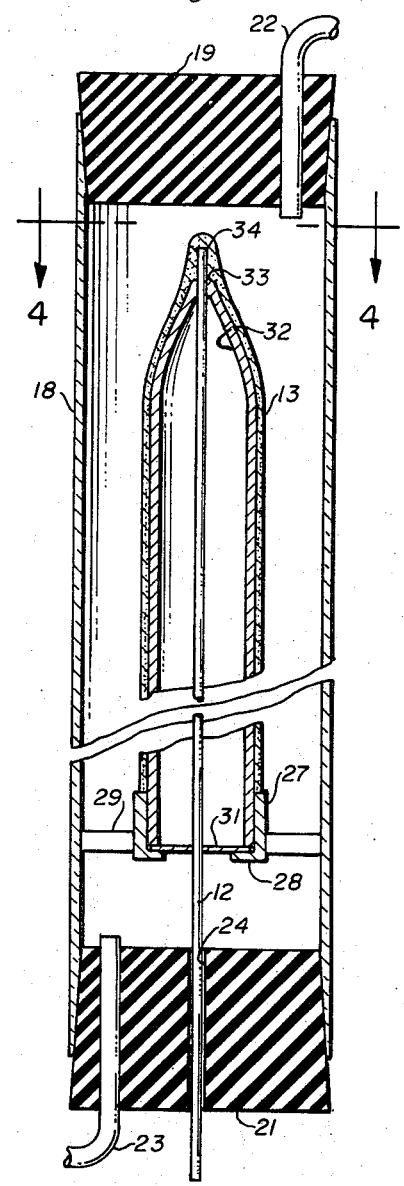
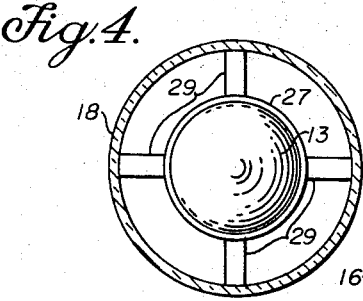
INVENTOR.
ROBERT A. HOLZL
BY Stanley Bialos
ATTORNEY United States Patent Office 3,343,589
Patented Sept. 26, 1967

3,343,589
GASEOUS DEPOSITION METHOD OF MAKING A THERMOCOUPLE PROBE
Robert A. Holzl, La Canada, Calif., assignor to San Fernando Laboratories, San Francisco, Calif., a corporation of California
Filed June 25, 1964, Ser. No. 377,895
3 Claims. (Cl. 164—46)

The present invention relates to temperature measurement and, more particularly, to a thermoelectric temperature sensing device and method for making the same. Thermoelectric temperature sensing devices such as thermocouples, thermopiles and bolometers are used in many environments for accurate determination of temperatures, including extremely high temperatures.

Basically, a thermocouple comprises a closed electrical circuit of at least two materials with different thermoelectric properties. These materials are united to provide a so-called hot junction which is subjected to the environment the temperature of which is to be measured. A small electromotive force, i.e., in the microvolt range, and an associated current are generated in the circuit; and their values are proportional to the temperature at the hot junction.

The portion of a thermocouple carrying the hot junction and which is commonly subjected to the temperature environment is called a thermocouple "probe." In one well known type of probe, sometimes called the tube type, one of the materials is in the form of an electrically conducting tube and encloses the other which is in the form of an electrically conducting wire. Except at the hot junction, the wire is spaced from the inner wall of the tube.

The hot junction in this type of probe is usually made by pressing, such as by swaging, one end of the tube about the wire to bring them together in intimate contact. It is customary then to fusion weld the materials together, or reinforce the junction by soldering or brazing.

All these prior methods to join the two materials to form the hot junction have inherent disadvantages. For example, with all of them, it is difficult not to have contamination at the joint. Besides reducing the actual contact area and integrity of the junction, contaminants can cause their own spurious effects on the generated electromotive force. In addition, welded joints are indeterminate, i.e., the junction materials mix at the junction, thereby lowering the generated electromotive force. Furthermore, due to the high temperature needed for welding, welded junctions are brittle and can easily break.

Another major disadvantage of fusion welded or brazed joints is that when formed, strain is introduced into the junction. Upon being subjected to high temperature environments, this strain is released. Thus, the calibration of the thermocouple, which is performed beforehand to determine its measuring characteristics, is thrown off an indeterminate amount, reducing its accuracy and reliability. In this connection, calibration is usually accomplished, as is known, by subjecting the hot junction to at least two known temperatures, and extrapolating between these temperatures to obtain a so-called calibration curve.

The present invention overcomes the disadvantages noted above. Summarizing the same, it comprises a temperature sensing device in which the hot junction interface, namely, the engaging or contacting faces of the materials having different thermoelectric properties, has a gaseous deposited bond formed desirably by the vapor deposition of one of the dissimilar materials to the other which is a solid member. While vacuum deposition, which is the melting and evaporation of the material itself to be deposited and its subsequent condensation on an unheated base material, may be used, for reasons appearing hereinafter, it is most advantageous that the gaseous deposition be by vapor deposition, which is the thermochemical reduction or decomposition of a volatile compound of the material to be deposited.

Desirably, the invention is embodied in the aforementioned tube-type thermocouple probe in which an inner electrical wire conductor is within an outer tubular electrical conductor. The tubular conductor itself is desirably formed by vapor deposition and has a vapor deposited bond to an end portion of the wire to form the hot junction.

As will be explained more fully hereinafter, a hot junction interface formed by vapor deposition is free of contaminants due to cleaning inherent in the deposition process. In addition, in vapor deposition, a sharply defined, substantially uniform interface molecular union is formed at the hot junction. Besides providing a strong adherent junction, this sharply defined intimate contact at the hot junction gives a greater sensitivity and accuracy than that obtained by conventional junctions. A vapor deposited hot junction is also essentially strain free. Therefore, it may be used many times in high temperature environments with complete confidence in its accuracy and reliability.

From the preceding, it is seen that the invention has as its objects, among others, the provision of an improved thermoelectric temperature sensing device and method of making the same which are economical and simple; in which the hot junction interface is free of contaminants and is strain free; is highly accurate and sensitive; and which has excellent structural strength. Other objects and advantages of the invention will become apparent from the following more detailed description taken in conjunction with the accompanying drawings in which:

FIGURE 1 is a vertical cross-sectional view, partly in elevation, of a preferred thermocouple probe of the invention;

FIGURE 2 is a horizontal section taken in a plane along line 2—2 of FIGURE 1;

FIGURE 3 is a more or less schematic vertical cross-sectional view partly in elevation, of a form of apparatus for constructing the present probe, and depicting how it is made;

FIGURE 4 is a horizontal section taken in a plane along line 4—4 of FIGURE 3;

FIGURE 5 is a view similar to FIGURE 1 of an alternate embodiment of the invention showing an insulator as the mandrel for forming the outer conductor; and FIGURE 6 is a like view of another alternate embodiment of the invention showing a probe having two central conductors.

Referring to FIGURES 1 and 2, there is shown a thermocouple probe 11 of the tube-type which comprises, in general, inner electrical wire conductor 12 and outer tubular electrical conductor 13. An electrical insulator 14 of tubular form is disposed in tube 13 at one end of the tube, and wire 12 extends therethrough in order to prevent the tube and wire from contacting. An inert gas, such as argon or helium, is preferably provided in a conventional manner within the thermocouple inwardly of the insulator to prevent oxidation of the thermocouple materials. Leads, schematically illustrated at 15 and 16, are connected, respectively, to wire 12 and tube 13. These leads provide the means for connecting the thermocouple probe in a conventional thermocouple voltage or current measuring circuit.

In keeping with the invention, outer tubular conductor 13 has a vapor deposited bond to an end portion of inner wire conductor 12 to form a thermocouple hot junction generally indicated at 17. As can be seen, outer conductor 13 intimately contacts and completely encases the end portion and end of the wire in a sharply defined, substantially uniform interface. For optimum ruggedness of the hot junction joint, it is preferred that the outer conductor project at least 20 mils along the length of the wire, but this dimension is not critical.

As mentioned before, hot junction 17 is free of interfacial contaminants because it is formed by vapor deposition. The base material, i.e., wire conductor 12, is conventionally heated during the formation of the junction. Therefore, volatile contaminants which would not be removed from it by standard cleaning are volatilized.

Although the vapor deposition can be performed by the well known thermal decomposition of a gaseous compound of the metal of deposited outer conductor 13, it is desirable that the vapor deposition be by the equally as well known thermochemical reduction of a gaseous compound of the metal by a suitable reducing agent such as hydrogen gas. Then the reducing agent can be employed to reduce and volatilize remaining contaminants on the end portion of wire conductor 12. This cleaning of the wire conductor coupled with the fact that the metal of the outer conductor is deposited in a substantially pure state assures a clean junction.

Also, as mentioned earlier, molecules of outer conductor 13 deposit during the vapor deposition at the hot junction interface and form a molecular union with the molecules of the inner conductor. This provides an intimately contacting bond between such conductors at a sharply defined interface, in contradistinction to a union such as by welding, wherein the two metals necessarily flow or merge together, thus, rendering the interface non-uniform. This sharp interface of the instant invention has uniform characteristics throughout its whole contact area, resulting in accurate and uniform temperature measurement.

The vapor deposited outer conductor 13 has a metallic grain formation throughout its entire thickness characteristic of vapor deposited metal, namely, a crystalline formation of the deposited metal projecting with a sharp line of demarcation uniformly or evenly from the interface between the metals, usually a columnar crystalline formation. This crystalline formation and sharp interface at the hot junction can be readily observed microscopically.

During the formation of the hot junction, wire conductor 12 and the depositing material to form outer conductor 13 are at the same temperature which can be well below the melting point of either. Thus, the junction formed is essentially strain free, resulting in reproducible readings. That is, whenever the hot junction is heated, there is no strain present to be released. Therefore, the electromotive force and current generated in all uses of the probe closely follows the aforementioned calibration curve.

Due to the sharply defined, intimate contact at the hot junction and the lack of contaminants and strain thereat, hot junctions of the invention have been made which are sensitive and accurate at temperatures much higher than effectively measured with previous hot junction probes, i.e., above 5,000° F.

The conductors and insulator can be of any of the materials generally employed in thermocouples, as long as the outer junction material is a vapor depositable material.

For high temperature applications, it is preferable that the conductors be refractory metals, such as tungsten, molybdenum, tantalum or alloys thereof; and in all cases the respective conductors 12 and 13 are of different metal or alloys thereof to provide the different thermoelectric properties. Insulator 14 can be of any high temperature non-electrical conducting ceramic such as beryllia, thoria, or alumina. In a preferred embodiment, wire conductor 12 is an alloy consisting of tungsten and 26% rhenium while outer conductor 13 is entirely formed by vapor deposition and is pure tungsten, and insulator 14 is beryllia.

Reference is now made to FIGURES 3 and 4 for a description of the apparatus and method for making a tube-type thermocouple probe of the invention. In these views, which depict formation of the probe shown in FIGURES 1 and 2, the same reference numerals are applied to the inner and outer conductors.

The apparatus includes a tube 18 of a suitable non-conducting material capable of withstanding relatively high temperatures, preferably Pyrex glass, having upper and lower stoppers 19 and 21, respectively, sealing its ends. These stoppers can be of any suitable heat resistant material, such as highly heat resistant rubber or rubber compositions.

Tubes 22 and 23, extend through stoppers 19 and 21, respectively, for the introduction and exit, respectively, of the depositing vapor into and from glass tube 18. Stopper 21 also has an axial hole 24 therethrough adapted to closely fit about central wire conductor 12 which can be projected therethrough.

A collar 27 having an annular flange 28 is axially supported within tube 18 by radial arms 29. A disc 31 which has a hole through its center for the passage of wire conductor 26 rests loosely on flange 28 within the collar.

Collar 27 and disc 31 support a tubular mandrel 32 of any suitable material that can be removed after vapor deposition of outer conductor 13 thereon. One end of mandrel 32 closely fits removably within the collar and rests on disc 31. The other end portion of the mandrel is attached in substantial engagement, such as by pressing or crimping, to the aforementioned wire conductor 12 at 33 near its upper end. The wire conductor should project a distance beyond the mandrel 32. This projecting portion 34 should have a length equal to the desired length of the junction. As mentioned before, this should desirably be at least 20 mils for optimum ruggedness, but can be any suitable distance.

The mandrel 32 can be of any desired shape depending on the shape of the probe intended. Its length should be at least equal to the desired length of the probe plus the height of collar 27 above disc 31. Also, mandrel 32 should be of any suitable material which is both electrical conducting so that it may be heated by induction and which can be corrosively dissolved by any suitable agent that will not dissolve wire conductor 12 or exterior conductor 13 after it is formed over the mandrel. A suitable material for mandrel 32 when employed to effect formation of a probe from any of the aforementioned highly refractory metals is steel.

Outer conductor 13 is deposited on mandrel 32 and on the projecting end portion 34 of inner wire conductor 12 by conventional vapor deposition techniques. As previously mentioned, thermochemical reduction in the presence of a reducing agent is preferred. The temperatures, deposition times, flow-rates, compounds to be used, etc., depend on the material being deposited and thickness thereof desired, and are all well known.

Mandrel 32 and wire 12 are preferably heated to the depositing temperature by induction. That is, a high frequency induction coil (not shown) is placed axially about tube 18. When a high frequency current is passed therethrough, it induces a rapidly changing current in mandrel 32 and wire 12 and, thus, heats them. This heating volatilizes some of the contaminants on the wire end portion 34. The reducing gas is introduced into tube 18 to flush the tube out and reduce and volatilize other contaminants on end portion 34. Then the depositing vapor along with the depositing gas is continuously passed through tube 18. While the direction of flow is not too important, it is preferable that the depositing gas and reducing gas enter through upper tube 22 and be drawn off through lower tube 23 in order that wire end portion 34 is first exposed to the fresh gas.

When the vapor contacts heated mandrel 32 and end portion 34 of wire 12, it is heated and thereby thermochemically reduced. Thus, the material is deposited on mandrel 32 to form tubular outer conductor 13, and deposited on wire end portion 34 to form the hot junction as shown in FIGURE 2. It should be noted that disc 31 substantially prevents the vapor from getting into the mandrel and depositing within its interior.

As an example of a thermocouple of the present invention and the method of making it, inner wire conductor 12 can be of a tungsten and 26% rhenium alloy, and outer conductor 13 be of pure tungsten. Wire 12 is desirably in the range of about 15 to 25 mils in diameter, preferably about 20 mils, while the outer conductor can be made of any desired thickness depending on its use, but is usually in the range of 20 to 200 mils, preferably about 100 mils. The mandrel 32 can be of steel and is desirably as thin as practical, preferably about 10 mils.

The mandrel and wire end portion 34 can be heated to a suitable temperature, preferably about 950° C., by induction. Desirably, the reducing gas, hydrogen, is first introduced into tube 18 through tube 22 to flush out tube 18.

A mixture of tungsten hexachloride and hydrogen gas of about 7.5 molal mixture ratio ($H_2/WCL_6$) is then introduced into tube 18 through tube 22, at a pressure of about 1 mm. Hg absolute. This mixture becomes heated by mandrel 32 and wire end portion 34. The hydrogen reduces the tungsten hexachloride to substantially pure tungsten (more than 99.9% pure) and hydrogen chloride gas. The tungsten deposits onto mandrel 32 and projecting wire end portion 34. As has been explained before, the interface between the inner and outer conductors is sharply defined and forms an adherent and clean hot junction 17. The hydrogen chloride gas flows out through tube 21.

When the outer conductor has reached the desired thickness, the gas flow is turned off. The thermocouple probe can be removed from the apparatus through the top of tube 18 after stopper 19 is removed.

A suitable corrosive agent, such as hydrochloric acid, is introduced into the interior of the thermocouple in order to remove mandrel 13 by dissolving the same. After the mandrel has been completely removed, the thermocouple is washed and wire conductor 12 cut to the desired length. The cylindrical end of tubular conductor 13 may be ground to remove any rough edges and then insulation 14 inserted therein. An inert gas can be introduced into the interior of the probe in a conventional manner, thereby completing the probe in the form shown in FIGURES 1 and 2.

It is to be understood that many modifications of the probe and the method and apparatus for making same are possible within the scope of the invention. For example, mandrel 32 need not be removed from the probe by corrosive action. If the difference between its thermal expansion and that of outer conductor 13 will permit, it may be mechanically slipped out from within the outer conductor.

With regard to the probe itself, the entire outer conductor 13 need not be formed by vapor deposition as long as the hot junction 17 is so formed. For example, a lower portion of outer conductor 13 shown in FIGURE 2, can be a separate sleeve connected in any suitable manner, such as by welding or vapor deposition, to an upper portion containing the hot junction.

In addition, if the thermocouple is not to be used to measure extremely high temperatures, as shown in FIGURE 5, the mandrel can be an insulator 34 itself and then does not have to be removed. In this embodiment, it is preferred that the insulator be a refractory such as beryllia, thoria or alumina in order that it be able to withstand reasonably high temperatures.

Since these materials are non-conducting, another method of heating, e.g., by radiation, should be used rather than induction. The other elements of this thermocouple are similar to those in FIGURE 1 and are referred to by like numerals.

FIGURE 6 shows another embodiment of the invention employing two inner conducting wires 37 and 38 possessing different thermoelectric properties. A vapor deposited outer conductor 39 forms a vapor deposited electrical conducting bridge portion 41 between end portions 44 and 46, respectively, of wires 37 and 38. Bridge portion 41 completely encases the ends and end portions 44 and 46 of wires 37 and 38 in an intimately contacting bond to each at a sharply defined interface.

Bridge portion 41 may be, but does not have to be, of the same material as wire conductor 37 or 38. When the bridge portion is of the same material as one of the wires, the interface between the bridge portion and the other wire is the hot junction interface.

However, when the bridge portion 41 is of a different material than either of wire conductors 37 or 38, the bridge portion acts as an electrical conductor between wire end portions 44 and 46 and is part of the hot junction. In this case, two interfaces form the hot junction, i.e., the one between wire end portion 44 and bridge 41 and the one between wire end portion 46 and bridge 41. Both of these interfaces must be subjected to the environment the temperature of which is to be measured.

Since wire end portions 44 and 46 and bridge 41 are at the same temperature, any electromotive force generated at one wire end portion due to the bridge being present will be cancelled out by an equal and opposite electromotive force at the other end portion.

In any event, in the embodiment of FIGURE 6, since wires 37 and 38 are of different thermoelectric properties, the vapor deposited bridge 41 encasing the end portions of the wires will be of different thermoelectric properties than at least one of the wire end portions 44 or 46.

The outer conductor acts, in this embodiment, as a protective sheath. Leads 42 and 43 for connecting the probe in a conventional thermocouple circuit are attached to wire conductors 37 and 38, respectively.

This embodiment can be constructed in a manner similar to the construction of the embodiment of FIGURES 1 and 2. However, mandrel 32 would be pressed about the end portions of both wires 37 and 38 with a mandrel bridge portion between the wire end portions to space them apart.

I claim:

1. A method of making a thermocouple probe comprising providing an electrical wire conductor, supporting a tubular mandrel about said wire conductor with an end portion of said mandrel in substantial engagement with said wire and with said wire projecting exteriorly beyond said mandrel end portion, and exposing said mandrel and said projecting portion of said wire to a gaseous metal compound, heating said wire and said mandrel to effect gaseous deposit of said metal onto the projecting portion of said wire and onto said mandrel to form a junction with said exteriorly projecting portion of said wire.

2. A method of making a thermocouple probe of the type having an inner wire conductor and outer tubular metal conductor of different thermoelectric properties and a hot junction between said conductors which comprises supporting a tubular mandrel about said wire with an end portion of said mandrel in substantial engagement with said wire and with said wire projecting exteriorly beyond said mandrel end portion, exposing said mandrel and said projecting portion of said wire to a gaseous compound of said metal, heating said wire and said mandrel to effect vapor deposit of metal onto the projecting portion of said wire to form said hot junction, and onto said mandrel to form said outer tubular conductor, and removing said mandrel after formation of said outer tubular conductor.

3. The method of claim 2 wherein the mandrel is of material that can be dissolved in a suitable agent, and removing the mandrel by dissolving the same in said agent.

References Cited

UNITED STATES PATENTS

| | | | |
|---|---|---|---|
| 2,061,357 | 11/1936 | Heyroth et al. | 136—228 |
| 2,562,770 | 7/1951 | Carter | 136—201 X |
| 2,698,352 | 12/1954 | Fagg et al. | 136—228 |
| 2,838,589 | 6/1958 | Hunrath | 136—237 |
| 2,955,566 | 10/1960 | Campbell et al. | 75—84.4 |
| 3,006,978 | 10/1961 | McGrath et al. | 136—225 X |
| 3,071,495 | 1/1963 | Hanlein | 136—212 X |
| 3,264,714 | 8/1966 | Baer | 136—201 X |

FOREIGN PATENTS 587,490   4/1947   Great Britain.

WINSTON A. DOUGLAS, *Primary Examiner.*

A. M. BEKELMAN, *Assistant Examiner.*